United States Patent
Vitruk et al.

(10) Patent No.: US 7,079,739 B1
(45) Date of Patent: Jul. 18, 2006

(54) FLEXIBLE HOLLOW WAVEGUIDE AND METHOD FOR ITS MANUFACTURE

(76) Inventors: Peter Vitruk, 20029 99th Ct. NE., Bothell, WA (US) 98011; Paul Diaz, 15745 NE. 143rd Pl., Woodinville, WA (US) 98072

( * ) Notice: Subject to any disclaimer, the term of this patent is extended or adjusted under 35 U.S.C. 154(b) by 39 days.

(21) Appl. No.: 10/998,119

(22) Filed: Nov. 26, 2004

Related U.S. Application Data

(60) Provisional application No. 60/525,765, filed on Nov. 28, 2003.

(51) Int. Cl.
*G02B 6/32* (2006.01)
*G02B 6/36* (2006.01)

(52) U.S. Cl. .................. 385/123; 385/125; 385/127

(58) Field of Classification Search ............. None
See application file for complete search history.

(56) References Cited

U.S. PATENT DOCUMENTS

| | | | |
|---|---|---|---|
| 4,652,083 A | 3/1987 | Laakmann | |
| 4,805,987 A * | 2/1989 | Laakmann et al. | ......... 385/125 |
| 4,913,505 A | 4/1990 | Levy | |
| 4,930,863 A | 6/1990 | Croitoriu | |
| 5,325,458 A | 6/1994 | Morrow | |
| 5,440,664 A | 8/1995 | Harrington | |
| 5,567,471 A | 10/1996 | Harrington | |
| 5,729,646 A * | 3/1998 | Miyagi et al. | ............... 385/125 |
| 5,815,627 A * | 9/1998 | Harrington | ................... 385/125 |

* cited by examiner

*Primary Examiner*—Akm Enayet Ullah
*Assistant Examiner*—Omar Rojas

(57) ABSTRACT

A flexible hollow waveguide for high efficiency transmission of laser light, comprising: (a) metal cladding tube having interior surface; and (b) elongated bent ribbon of a substrate material; said ribbon having concave interior surface and convex exterior surface and first and second edges therebetween; said ribbon is positioned in said metal cladding tube; said interior surface of the metal cladding tube engaging the said convex exterior surface of the ribbon to hold said first and second edges together and to define an elongated seam therebetween; and (c) first metal layer on the said concave interior surface of the said ribbon; said first metal layer having a elongated discontinuity defined by the said seam; and (d) seamless light reflective second metal layer formed on top of the first metal layer; and (e) seamless light-reflectivity enhancing dielectric layer formed on top of the said second metal layer.

20 Claims, 3 Drawing Sheets

FLEXIBLE HOLLOW WAVEGUIDE AND METHOD FOR ITS MANUFACTURE

REFERENCE TO PROVISIONAL APPLICATION

This application claims the benefit of the U.S. Provisional Application No. 60/525,765 filed on Nov. 28$^{th}$ 2003.

TECHNICAL FIELD

This invention relates to waveguides for transmitting infrared radiation, and more particularly to a flexible hollow-fiber waveguide for transmitting mid-infrared radiation with low attenuation.

BACKGROUND OF INVENTION

Prior art flexible hollow waveguide for transmitting coherent $CO_2$ laser radiation described by Katherine D. Laakmann (U.S. Pat. No. 4,652,083) defines a hollow tube having both metal and dielectric layers on its inner surface. First layer on the inner surface of the hollow tube is a highly reflective metal coating. Second layer on top of reflective metal coating is the dielectric coating having its thickness chosen to enhance the reflectivity for both polarizations of the transmitted laser light at the wavelength desired. However, U.S. Pat. No. 4,652,083 did not describe a suitable manufacturing method to produce an inexpensive, durable and efficient hollow waveguide fiber. A particular problem in creating a commercially viable hollow waveguide fiber is forming a highly reflective metal layer (preferable gold, silver, copper or aluminum) on the inner surface of the small diameter tube, which is preferably made of metal, e.g. stainless steel, for durability and ruggedness. Typical metal coating techniques onto metal substrates involve electroplating, which is not feasible inside of a small diameter (typically 1 mm or less) and long (typically 1 m or more) stainless steel tubing. Another prior art design (U.S. Pat. No. 4,913,505 by Michael B. Levy) has successfully overcome these manufacturing problems by depositing required metal and dielectric layers onto ribbon shaped substrate prior to forming a hollow waveguide. U.S. Pat. No. 4,913,505 defines a lightpipe, which is formed by rolling an elongated ribbon into an elongated tubular structure already having highly reflective coating on its inner surface. However, this design has an intrinsic disadvantage of light scattering/absorbing seam extending the whole length of the finished hollow waveguide fiber.

Another prior art hollow waveguide fiber design by Natan Croitoriu et. al. (U.S. Pat. No. 4,930,863) defines metal layer of silver deposited on the inner surface of the hollow glass or dielectric tube using well known glass mirror silvering techniques. Once the silver layer is formed, then silver iodide AgI dielectric layer can be formed by iodizing the silver Ag layer. Such design and method was further significantly improved by James A. Harrington et. al. (U.S. Pat. Nos. 5,440,644 and 5,567,471) by using fused silica tubing with its highly polished inner surface. A particular disadvantage of glass and fused silica hollow waveguide fibers, particularly in commercial medical applications, is a necessity to employ rugged and often expensive jacketing around the fiber to facilitate safe and secure usage of such fibers. Another prior art hollow waveguide fiber design by Clifford E. Morrow et. al. (U.S. Pat. No. 5,325,458) utilizes a very simple design having a hollow silver Ag tube having its inner surface chemically polished and then chemically treated to create silver halide (AgBr, AgCl or AgI) dielectric layer. However, disadvantage of such design is due to relative softness of the silver tubing and necessity to employ rugged and often expensive jacketing around the fiber to facilitate safe and secure usage of such fibers.

It is an object of the present invention to provide an efficient design and method for manufacturing an inexpensive, durable and rugged metal tube hollow waveguide fiber having seamless light guiding inner bore surface.

It is an another object of the present invention to provide an efficient design and method for manufacturing an inexpensive, durable and rugged metal tube hollow waveguide fiber having seamless silver (Ag) and silver halide (AgI, AgBr or AgCl) plated light guiding inner bore surface.

Still yet another object of present invention is to provide an efficient method for eliminating light scattering/absorptive seam inside of the ribbon-formed hollow waveguide fiber by forming a seamless light-reflective layer over the inner surface of the ribbon.

SUMMARY OF INVENTION

Flexible hollow waveguide for high efficiency transmission of laser light, according to present invention, consists of: (a) metal cladding tube having interior surface; and (b) elongated bent ribbon of a substrate material; said ribbon having concave interior surface and convex exterior surface and first and second elongated edges therebetween; said ribbon is positioned in said metal cladding tube; said interior surface of the metal cladding tube engaging the said convex exterior surface of the ribbon to hold said first and second edges together and to define an elongated seam therebetween; and (c) first metal layer on the said concave interior surface of the said ribbon; said first metal layer having a elongated discontinuity defined by the said seam; and (d) seamless light reflective second metal layer formed on top of the first metal layer; and (e) seamless light-reflectivity enhancing dielectric layer formed on top of the said second metal layer.

According to another aspect of present invention, flexible hollow waveguide for high efficiency transmission of laser light made by the process of: (a) providing an elongated ribbon of a substrate material, said ribbon having first and second opposite elongated edges spaced apart by a substantially uniform width and first and second sides therebetween; and (b) forming a light reflecting metal layer on said first side; and (c) after forming metal layer, bending said ribbon to position said first and second edges together and to deform said first side into a concave interior surface and to deform said second side into convex exterior surface; and (d) providing a metal cladding tube having interior surface and interior diameter; and (e) after bending said ribbon, positioning said bent ribbon in said metal cladding tube with said interior surface of said metal cladding tube engaging said convex exterior surface of said bent ribbon to hold said first and second edges together; and (f) reducing said interior diameter of said metal cladding tube to form a closely-fitting enclosure around said bent ribbon; and (g) forming a seamless light-reflectivity enhancing dielectric layer on the surface of the metal layer.

In still another aspect, present invention provides for a method of making a waveguide for high efficiency transmission of laser light comprising the steps of: (a) providing an elongated ribbon of a substrate material, said ribbon having first and second opposite elongated edges spaced apart by a substantially uniform width and first and second sides therebetween; and (b) forming first metal layer on said first side; and (c) after forming first metal layer, bending said ribbon to position said first and second edges together and to deform said first side into a concave interior surface and to deform said second side into convex exterior surface; and (d) providing a metal cladding tube having interior surface and interior diameter; and (e) after bending said ribbon, positioning said bent ribbon in said metal cladding tube with said interior surface of said metal cladding tube engaging said convex exterior surface of said bent ribbon to hold said first and second edges together; and (f) reducing said interior diameter of said metal cladding tube to form a closely-fitting enclosure around said bent ribbon; and (g) forming a seamless light reflecting second metal layer over the surface of the first metal layer, and (h) forming a seamless light-reflectivity enhancing dielectric layer on the surface of the second metal layer.

DETAILED DESCRIPTION OF THE INVENTION

Throughout this description, the embodiments and examples shown should be considered as exemplars, rather than as limitations on the present invention.

Figure 1:
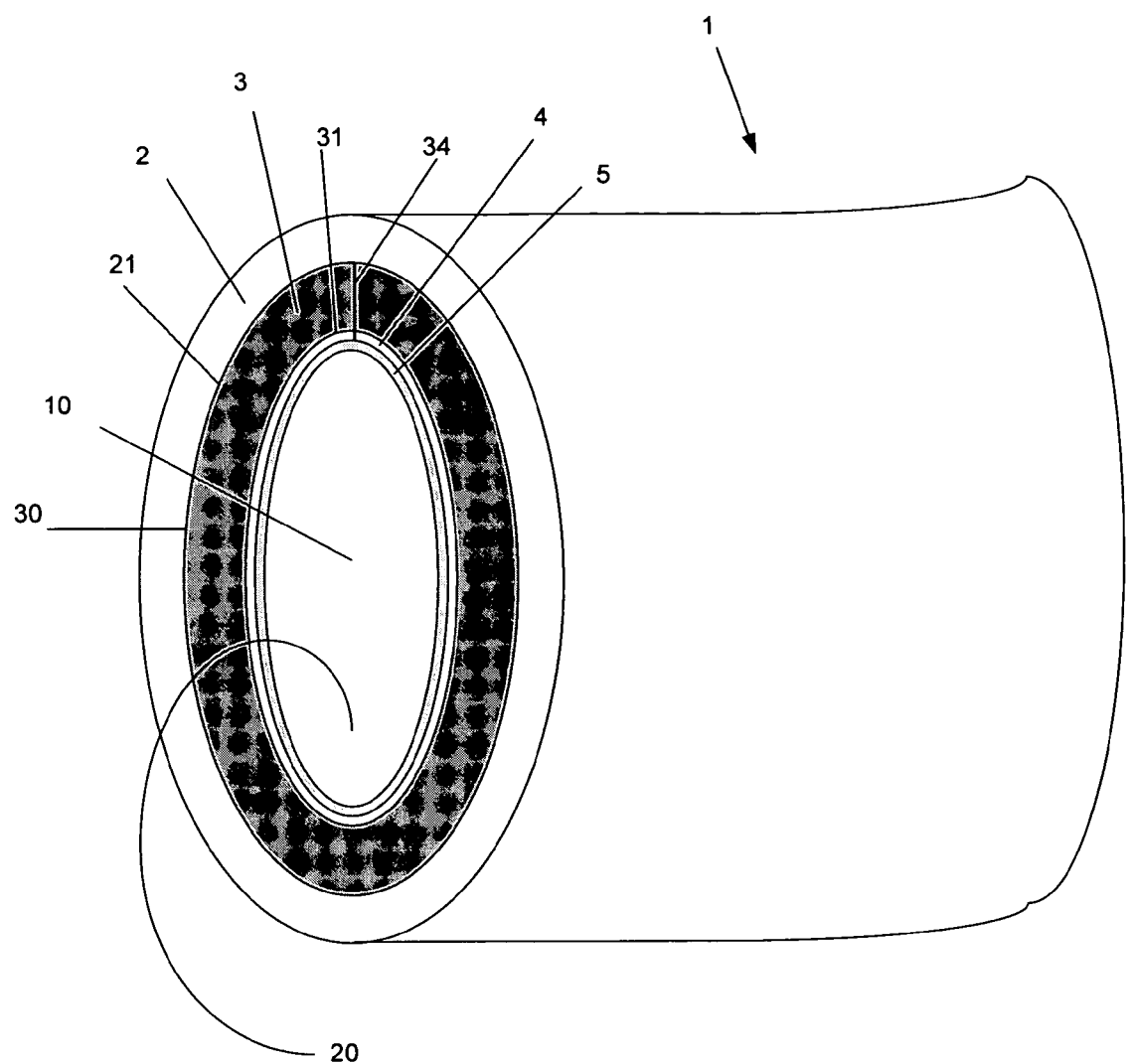
FIG. 1 is a schematic end view of first embodiment of the hollow waveguide according to present invention.

FIG. 1 diagrammatically illustrates a hollow waveguide fiber 1, constructed according to the first embodiment of the present invention for transmitting infrared from both incoherent and coherent sources. Hollow waveguide 1 includes light propagating bore 10 of preferably circular aperture enclosed by the bore surface 20.

Figure 2:
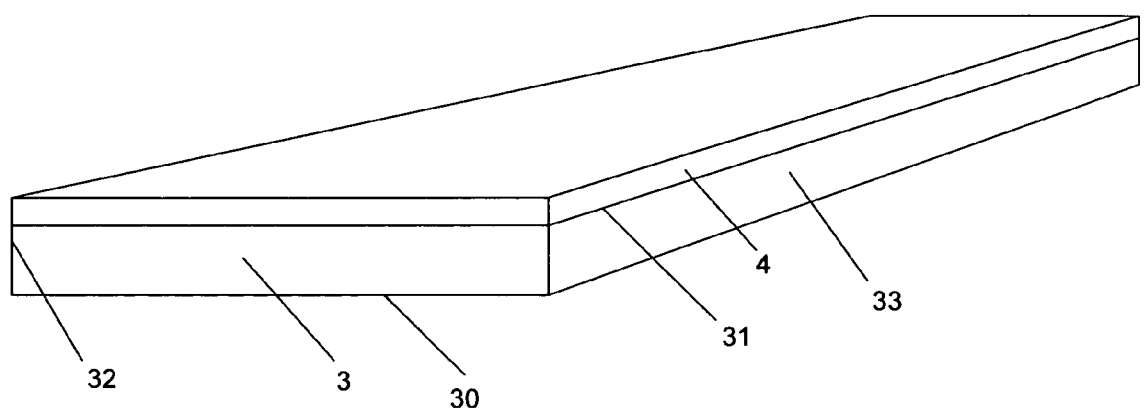
FIG. 2 is a schematic end view of the ribbon having highly reflective metal layer deposited on its first side

Making of the waveguide begins with the selection of the metal cladding tube 2 having interior surface 21 as illustrated in FIG. 1 and ribbon 3 having edges 32 and 33 and its first side 31 and second side 30 defined between the edges 32 and 33 as illustrated in FIG. 2. In order to minimize loss of power and coherence of the laser light transmitted through the hollow waveguide, the inner surface of the waveguide bore 20 needs to be as smooth as possible and as reflective as possible for all the polarization of light waves inside the waveguide 1. Therefore, surface 31 of the ribbon 3 is prepared to have its smoothness of about 0.05 micrometer or better; commercially available molybdenum ribbon allows for such high quality surface finish.

It is important to emphasize that neither electroplating nor vacuum evaporating/sputtering techniques can be applied to the interior of the long and small diameter metal tubing. Thus, it is critically important for the purposes of this invention to apply the metal layer 4 to the ribbon 3 prior to bending the ribbon 3 and installing it inside the metal cladding tube 2 according to present invention.

A light reflective metal layer 4 is formed (or deposited) onto the first side 31 of the ribbon 3 as illustrated in FIG. 2. Metal layer 4 is deposited in such a way as to retain ribbon's smooth surface finish. Preferably, metal layer 4 is formed (or deposited) using electroplating techniques. However, in other embodiments reflective metal layer 4 may be deposited by vacuum metal evaporation and sputtering techniques.

The reflective layer is preferably silver of less than 1 micrometer in thickness, which provides very high coefficient of reflectivity in UV, visible and IR range of wavelengths. However, other embodiments may use metals (e.g., gold, copper, aluminum, platinum, molybdenum, zinc, and nickel) and semiconductors as the reflective metal layer 4 of a different thickness. An intermediary thin layer (less then approximately 0.010 micrometers) made of Cr, Ni or Ti may be deposited first onto the first side 31 of the ribbon 3 in order to facilitate and enhance the adhesion of metal layer 4 to ribbon 3.

Figure 3:
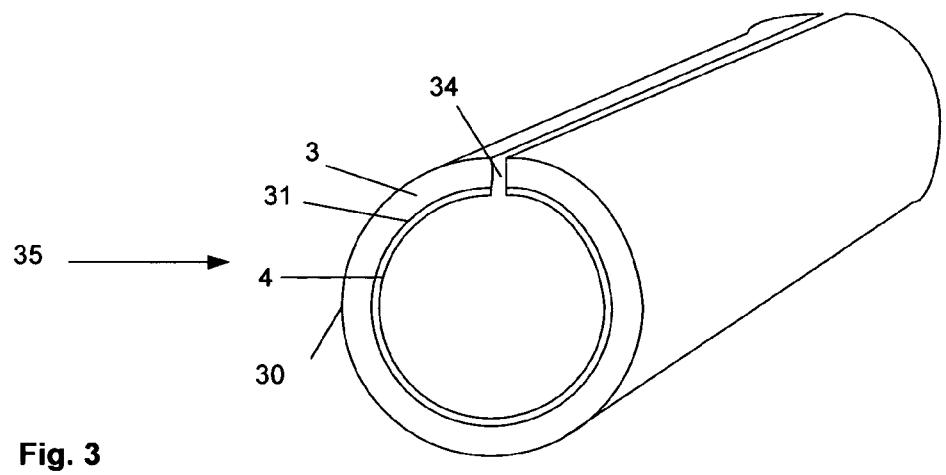
FIG. 3 is a schematic end view of the ribbon with reflective metal layer on it and bent to form a tube having a seam.

After the deposition of the reflective layer 4, the ribbon 3 is bent into a tubular structure 35 shown in FIG. 3 having ribbon's first side 31 permanently deformed into concave internal surface and having ribbon's second side 30 permanently deformed into convex external surface. Both elongated edges 32 and 33 of the ribbon are placed in close proximity to each other and are facing each other so as to form an elongated seam 34. At this stage of waveguide manufacturing, tubular structure 35 is very fragile and cannot be bent without being permanently damaged; tubular structure 35 needs rugged and flexible support mechanism. Metal cladding 2 shown in FIG. 1 is aimed to provide necessary ruggedness and flexibility for the waveguide according to present invention.

Thus, the tubular structure 35 is placed inside a metal cladding tube 2, as FIG. 1 illustrates. Then the metal cladding tube 2 is drawn through a set of wire dies (commercially available for a variety of desired diameters) to reduce its exterior and interior diameters and to hold both edges 32 and 33 tightly together and, thus, to reduce the width of the seam 34. After the drawing step, the metal cladding tube 2 with the bent ribbon 3 inside can be safely deformed, bent and twisted without edges 32 and 33 coming apart. At this stage of the hollow waveguide making, the light-reflectivity enhancing dielectric layer 5 can be deposited onto the exposed surface of the metal layer 4 to further enhance light reflectivity of surface 20 and to eliminate seam 34 from reaching the surface 20 of the finished waveguide bore 1 in order to minimize the scattering and absorption of the light by the seam 34.

The purpose of the dielectric layer 5 is to maximize the reflectivity coefficient of the waveguide bore surface 20 for both P and S polarization of the light waves propagating inside the waveguide 1. Dielectric layer 5 preferably has an index of refraction that is less than the index of refraction of the reflective layer 4. Dielectric layer 5 is formed (or deposited) on the bore of the reflective layer 4 in a manner that substantially retains or improves the smoothness of the exposed surface of the bore 20. The dielectric film 5 is seamless and enhances the reflectively of the bore of the waveguide 1. The exact thickness of the dielectric film 5 is determined by optical measurements and is carefully controlled to give the lowest loss at a particular infrared wavelength transmitted through the waveguide. Preferably, the dielectric film 5 is approximately 0.1 to 0.8 micrometer thick. In the preferred embodiment, the dielectric film is silver iodide. However, in other embodiments, the dielectric layer 5 may be inorganic compounds (e.g., silver bromide, silver halide, copper iodide, copper selenide, silver sulfide, zinc selenide, and zinc sulfide, lead fluoride, etc). Metal halide and oxides films can be produced by a number of methods described in the published literature and prior art. These methods include liquid phase reactions or gas phase (e.g. chlorine) reactions.

Figure 4:
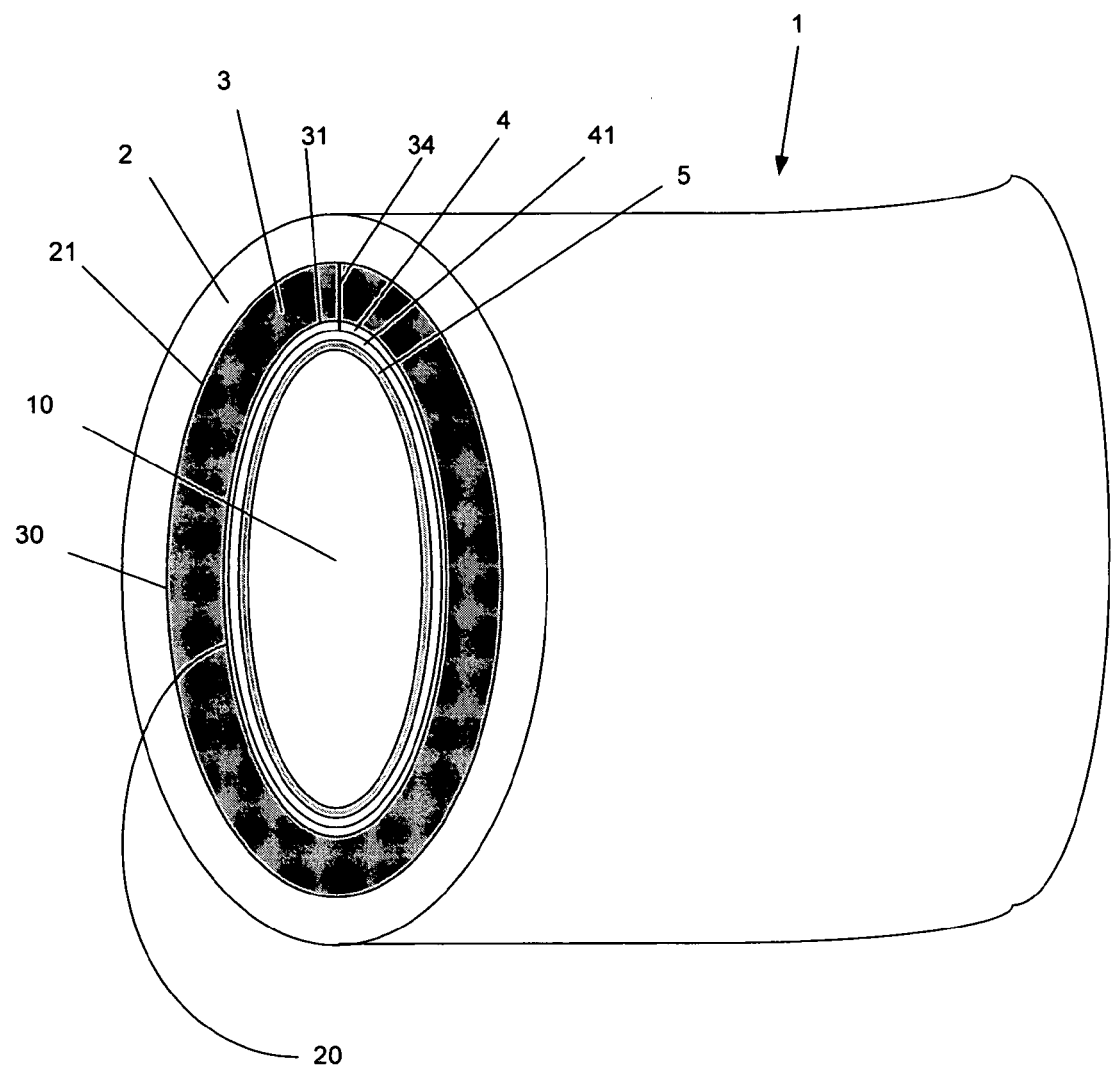
FIG. 4 is a schematic end view of a second embodiment of the hollow waveguide according to present invention.

FIG. 4 diagrammatically illustrates a hollow waveguide fiber 1, constructed according to another embodiment of the present invention for transmitting infrared radiation from both incoherent and coherent sources. In addition to light reflecting first metal layer 4 and dielectric layer 5, this embodiment also includes a second metal layer 41 formed (or deposited) on top of the first metal layer 4 just before forming (or deposition) of the dielectric layer 5. Preferably, the second metal layer is a silver film deposited by propelling the mirror silvering solution through the waveguide. Mirror silvering solution consists of silver salt solution and a silver reducer solution. Such second metal layer 41 is seamless, which together with seamless dielectric layer 5 reduces the scattering and absorption losses for the laser light transmitted through the waveguide 1. Adhesion of the second metal layer to the surface of the first metal layer is enhanced if both layers made of the same metal (e.g. silver).

The inner exposed surface 20 of the dielectric film 5 defines a hollow interior volume 10 of the waveguide 1, which may contain air, another gas or gaseous mixture, vacuum, or any other medium preferably having an index of refraction that is approximately equal to 1. Waveguides in accordance with the present invention may be used to deliver high power (<1,000 Watts) infrared laser radiation for medical and industrial applications. Using the present invention, approximately 6-meter long hollow fibers can be made having very low attenuation, and high transverse spatial coherence for mid-infrared wavelengths from about 2.0 to 20 micrometers.

Example of the preferred embodiment of the present invention is schematically presented in FIG. 4 and its manufacturing method is described as follows. Molybdenum ribbon having surface finish of 0.05 micrometer or better is commercially available and is suitable for manufacturing a high quality hollow waveguide according to the present invention. In order to produce the waveguide with ID=1 mm, ribbon's width is chosen to be 3.14 mm and ribbon's thickness is 0.025 mm. Ribbon is electro-plated with silver layer having thickness of less than 0.5 micrometer. Ribbon is then rolled into the tube as shown in FIG. 3 and placed inside stainless steel metal cladding tube tubing having inside diameter of 1.2 mm and wall thickness of 0.08 mm. Stainless steel metal cladding tube is drawn through the set of wire dies in order to reduce metal cladding tube's inside diameter to 1.05 mm in order to minimize the width of the seam on the bent ribbon inside the metal cladding tube. Then, a mirror silvering solution comprising of silver salt solution and silver reducer solution is pumped through the waveguide to increase silver thickness and to close and cover an elongated seam. Finally, an iodine solution is pumped through the waveguide to form approximately 0.8 micrometer thick seamless layer of silver iodide suitable to enhance the light reflectivity at $CO_2$ laser wavelength of 10.6 micrometers. Alternative embodiment of the hollow waveguide has silver iodide thickness of 0.24 micrometers, which is more suitable for Er-YAG laser wavelength of 2.94 micrometers.

While several embodiments of the hollow waveguide of the invention and its inventive method of manufacture have been described in the foregoing, it will be understood by those skilled in the art that many modifications to the described process can be used without departing from the spirit and scope of the invention. Accordingly, the spirit and scope of the invention is to be limited only by the following claims.

We claim:

1. A flexible hollow waveguide for high efficiency transmission of laser light, comprising:
    (a) metal cladding tube having interior surface; and
    (b) elongated bent ribbon of a substrate material; said ribbon having concave interior surface and convex exterior surface and first and second elongated edges therebetween; said ribbon is positioned in said metal cladding tube; said interior surface of the metal cladding tube engaging the said convex exterior surface of the ribbon to hold said first and second edges together and to define an elongated seam therebetween; and
    (c) first metal layer on the said concave interior surface of the said ribbon; said first metal layer having a elongated discontinuity defined by the said seam; and
    (d) seamless light reflective second metal layer formed on top of the first metal layer; and
    (e) seamless light-reflectivity enhancing dielectric layer formed on top of the said second metal layer.

2. The waveguide of claim 1 wherein said substrate material is molybdenum, said ribbon having a thickness of less than about 0.003 inch and said metal cladding tube is made from stainless steel tubing having a thickness less than about 0.010 inch.

3. The waveguide of claim 1 wherein said first metal layer is a vacuum-deposited or electroplated thin film coating having thickness of less than approximately one wavelength of said laser light being transmitted through the waveguide.

4. The waveguide of claim 1 wherein said second metal layer is deposited by electroless metal plating process of propelling a liquid chemical solution through the waveguide; said second metal layer having thickness of less than approximately one wavelength of said laser light being transmitted through the waveguide.

5. The waveguide of claim 1 wherein said dielectric layer is formed by propelling liquid, gaseous or vapor chemicals through the tube, said dielectric layer has a thickness less than approximately one wavelength of said laser light being transmitted through the waveguide and said dielectric overcoat is formed from one of a group of materials comprising metal halides AgI, AgBr, AgCl and metal oxides.

6. A flexible hollow waveguide for high efficiency transmission of laser light made by the process of:
    (a) providing an elongated ribbon of a substrate material, said ribbon having first and second opposite elongated edges spaced apart by a substantially uniform width and first and second sides therebetween; and
    (b) forming a light reflecting metal layer on said first side; and
    (c) after forming metal layer, bending said ribbon to position said first and second edges together and to deform said first side into a concave interior surface and to deform said second side into convex exterior surface; and
    (d) providing a metal cladding tube having interior surface and interior diameter; and
    (e) after bending said ribbon, positioning said bent ribbon in said metal cladding tube with said interior surface of said metal cladding tube engaging said convex exterior surface of said bent ribbon to hold said first and second edges together; and
    (f) reducing said interior diameter of said metal cladding tube to form a closely-fitting enclosure around said bent ribbon; and
    (g) forming a seamless light-reflectivity enhancing dielectric layer on the surface of the metal layer.

7. The waveguide of claim 6 wherein the substrate material is selected from a group comprising molybdenum, beryllium copper, and stainless steel; said ribbon having a thickness of less than about 0.003 inch, said metal cladding tube is made from stainless steel tubing having a thickness less than about 0.010 inch.

8. The waveguide of claim 6 wherein said reflective metal is selected from the group consisting of silver, aluminum, gold, barium, chromium, copper, molybdenum, nickel, tin, tungsten, lead, zinc, iron and their alloys.

9. The waveguide of claim 6 wherein highly reflective metal layer is vacuum deposited or electro-plated silver film.

10. The waveguide of claim 6 wherein the step of forming said highly reflective metal surface comprises the steps of applying a thin film of metal from the group of Cr, Ni or Ti and then applying a highly reflective silver metal coating to said first side.

11. The waveguide of claim 6 wherein the process of making a waveguide additionally includes a step of seamless metal layer deposition after the drawing down said metal cladding tube and before forming said dielectric layer; said seamless metal layer is deposited by electroless metal plating process of propelling a liquid chemical solution through the waveguide.

12. The waveguide of claim 6 wherein said dielectric layer is formed from one of a group of materials comprising metal halides AgI, AgBr, AgCl or metal oxides; said dielectric layer is formed by propelling chemical liquid, gaseous or vapor solution through the waveguide.

13. The waveguide of claim 6 wherein the dielectric film is a compound selected from the group consisting of: (a) silver bromide; (b) silver iodide, (c) silver chloride; (d) copper iodide; (e) copper selenide; (f) silver sulfide; (g) zinc selenide; (h) zinc sulfide; (i) lead fluoride; (k) cadmium sulfide, (l) lead sulfide.

14. A method of making a waveguide for high efficiency transmission of laser light comprising the steps of:
(a) providing an elongated ribbon of a substrate material, said ribbon having first and second opposite elongated edges spaced apart by a substantially uniform width and first and second sides therebetween; and
(b) forming first metal layer on said first side; and
(c) after forming first metal layer, bending said ribbon to position said first and second edges together and to deform said first side into a concave interior surface and to deform said second side into convex exterior surface; and
(d) providing a metal cladding tube having interior surface and interior diameter; and
(e) after bending said ribbon, positioning said bent ribbon in said metal cladding tube with said interior surface of said metal cladding tube engaging said convex exterior surface of said bent ribbon to hold said first and second edges together; and
(f) reducing said interior diameter of said metal cladding tube to form a closely-fitting enclosure around said bent ribbon; and
(g) after reducing said diameter of said metal cladding tube, forming a seamless light reflecting second metal layer over the surface of the first metal layer, and
(h) forming a seamless light-reflectivity enhancing dielectric layer on the surface of the second metal layer.

15. The waveguide of claim 14 wherein said first metal layer is a vacuum-deposited or electroplated thin film coating having thickness of less than approximately one wavelength of said laser light being transmitted through the waveguide.

16. The waveguide of claim 14 wherein said second metal layer is formed by electroless metal plating process of propelling a liquid chemical solution through the waveguide; said second metal layer having thickness of less than approximately one wavelength of said laser light being transmitted through the waveguide.

17. The waveguide of claim 14 wherein the substrate material is selected from a group comprising molybdenum, beryllium copper, and stainless steel; said ribbon having a thickness of less than about 0.003 inch, said metal cladding tube is made from stainless steel tubing having a thickness less than about 0.010 inch.

18. The waveguide of claim 14 wherein said reflective metal is selected from the group consisting of silver, aluminum, gold, barium, chromium, copper, molybdenum, nickel, tin, tungsten, lead, zinc, iron and their alloys.

19. The waveguide of claim 14 wherein said dielectric layer is formed from one of a group of materials comprising metal halides AgI, AgBr, AgCl or metal oxides; said dielectric layer is formed by propelling chemical liquid, gaseous or vapor solution through the waveguide.

20. The waveguide of claim 14 wherein said hollow waveguide has an interior diameter of about 1 millimeter or less.

* * * * *